(12) United States Patent
Nishio et al.

(10) Patent No.: US 12,464,257 B2
(45) Date of Patent: Nov. 4, 2025

(54) IMAGE PROCESSING APPARATUS FOR CONTROLLING A WHITE BALANCE, IMAGE PROCESSING METHOD, AND STORAGE MEDIUM (71) Applicant: CANON KABUSHIKI KAISHA, Tokyo (JP)

(72) Inventors: Taisuke Nishio, Kanagawa (JP); Shunsuke Chino, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 98 days.

(21) Appl. No.: 18/597,700

(22) Filed: Mar. 6, 2024

(65) Prior Publication Data

US 2024/0251174 A1 Jul. 25, 2024

Related U.S. Application Data (63) Continuation of application No. PCT/JP2022/032158, filed on Aug. 26, 2022.

(30) Foreign Application Priority Data

Sep. 9, 2021 (JP) ................. 2021-146786

(51) Int. Cl.
*H04N 23/88* (2023.01)
*H04N 23/71* (2023.01)

(52) U.S. Cl.
CPC ............. *H04N 23/88* (2023.01); *H04N 23/71* (2023.01)

(58) Field of Classification Search
CPC .......... H04N 23/88; H04N 23/71; H04N 9/73; H04N 25/10
See application file for complete search history.

(56) References Cited

U.S. PATENT DOCUMENTS

| 9,462,247 B2* | 10/2016 | Takayama | H04N 1/6077 |
| 2008/0068468 A1* | 3/2008 | Kitajima | H04N 23/88 348/E9.051 |
| 2012/0013765 A1* | 1/2012 | Maruyama | H04N 23/88 348/E9.051 |
| 2015/0077587 A1* | 3/2015 | Kino | H04N 23/88 348/223.1 |
| 2015/0256800 A1* | 9/2015 | Sugiyama | H04N 25/71 348/279 |

(Continued)

FOREIGN PATENT DOCUMENTS

| JP | 2005130317 A | 5/2005 |
| JP | 2010109875 A | 5/2010 |

(Continued)

*Primary Examiner* — Padma Haliyur
(74) *Attorney, Agent, or Firm* — Canon U.S.A., Inc. IP Division (57) ABSTRACT

An image processing apparatus includes at least one processor, and a memory coupled to the at least one processor, the memory storing instructions that, when executed by the at least one processor, cause the at least one processor to perform a detection on influence of infrared light on colors of an input image, calculate a white balance control value based on the input image, and control a timing when the white balance control value for the input image is calculated, wherein the white balance control value is calculated at a first timing when a result of the detection is changed, and a second timing when presence of the influence of the infrared light is detected.

8 Claims, 8 Drawing Sheets

(56) References Cited

U.S. PATENT DOCUMENTS

| | | | | |
|---|---|---|---|---|
| 2016/0007001 | A1* | 1/2016 | Kuchiki | ................. H04N 23/88 |
| | | | | 348/223.1 |
| 2021/0044785 | A1* | 2/2021 | Hsiao | ................... H04N 25/131 |
| 2023/0360178 | A1* | 11/2023 | Hung | ................... G06V 20/588 |

FOREIGN PATENT DOCUMENTS

| | | |
|---|---|---|
| JP | 2010161460 A | 7/2010 |
| JP | 2012023606 A | 2/2012 |
| JP | 2014007692 A | 1/2014 |

* cited by examiner

IMAGE PROCESSING APPARATUS FOR CONTROLLING A WHITE BALANCE, IMAGE PROCESSING METHOD, AND STORAGE MEDIUM

CROSS-REFERENCE TO RELATED APPLICATIONS

This application is a Continuation of International Patent Application No. PCT/JP2022/032158, filed Aug. 26, 2022, which claims the benefit of Japanese Patent Application No. 2021-146786, filed Sep. 9, 2021, both of which are hereby incorporated by reference herein in their entirety.

BACKGROUND OF THE INVENTION

Field of the Invention

The present invention relates to a technique for processing an image captured by an imaging apparatus.

Background Art

There is known an imaging apparatus that controls white balance (hereinafter, referred to as WB) in a state where an imaging sensor takes in infrared light and outputs a color image.

Colors of a color image are typically designed assuming a state where the imaging sensor takes in only visible light, i.e., a state where an infrared cutoff filter (hereinafter, referred to as IRCF) is inserted into an optical axis such that the imaging sensor does not take in infrared light. On the other hand, there is an imaging apparatus having a mode in which the sensitivity of the imaging sensor is enhanced with the IRCF removed from the optical axis to enable the imaging sensor to take in infrared light at imaging in a low-illuminance environment or the like. However, as described above, the colors of the imaging apparatus are designed assuming the state where the imaging sensor does not take in infrared light. Thus, the colors of a color image become unbalanced by the taken-in infrared light. More specifically, as compared with a state where the imaging sensor does not take in infrared light, the colors of the captured image become reddish. In other words, color reproducibility of the imaging apparatus is deteriorated.

To solve such an issue, Japanese Patent Application Laid-Open No. 2005-130317 discusses a technique for switching a white balance control method depending on a position of the IRCF. According to Japanese Patent Application Laid-Open No. 2005-130317, depending on the position of the IRCF, it is determined whether to perform the white balance control such that a ratio between integral values of red, green, and blue (RGB) components of an entire screen is a prestored ratio or 1:1:1. This improves the color reproducibility of the imaging apparatus.

Further, with the enhancement in the sensitivity of an imaging device in recent years, the imaging device can take in visible light components even if exposure is reduced by an amount of taken-in infrared light in an IRCF removal state, and color information on an object is less likely to be lost in the IRCF removal state. In other words, the enhancement in the sensitivity of the imaging device makes it possible to easily obtain a captured image in which the visible light components and infrared light components are mixed.

CITATION LIST

Patent Literature

PTL 1: Japanese Patent Application Laid-Open No. 2005-130317

However, according to the conventional technique discussed in Japanese Patent Application Laid-Open No. 2005-130317, in a case where an object or a light source is changed in the IRCF removal state, the white balance is easily changed. Therefore, the white balance is largely changed during a period when consecutive imaging is performed, which may degrade image quality. In particular, when the white balance is largely changed in a use case where a specific object is continuously imaged for a long period under a specific condition, such as a case of using a monitoring camera, the colors of the same object are largely changed depending on the imaging timing, which may cause unnaturalness on the captured image.

SUMMARY OF THE INVENTION

The present invention is directed to an image processing apparatus that can properly control the white balance even in the IRCF removal state.

An image processing apparatus according to the present invention includes at least one processor, and a memory coupled to the at least one processor, the memory storing instructions that, when executed by the at least one processor, cause the at least one processor to perform a detection on influence of infrared light on colors of an input image, calculate a white balance control value based on the input image, and control a timing when the white balance control value for the input image is calculated, wherein the white balance control value is calculated at a first timing when a result of the detection is changed, and a second timing when presence of the influence of the infrared light is detected.

Further features of the present invention will become apparent from the following description of exemplary embodiments with reference to the attached drawings.

DESCRIPTION OF THE EMBODIMENTS

Some exemplary embodiments of the present invention are described below with reference to drawings.

The following exemplary embodiments are not intended limit the present invention, and all of combinations of features described in the exemplary embodiments are not necessarily essential for solving means of the present invention. Configurations in the exemplary embodiments can be appropriately modified or changed depending on the specification of an apparatus to which the present invention is applied, and various conditions (use condition, use environment, etc.). In addition, the exemplary embodiments described below may be partially combined as appropriate. In the following exemplary embodiments, a description is given while the same components are denoted by the same reference numerals.

First Exemplary Embodiment

Figure 1:
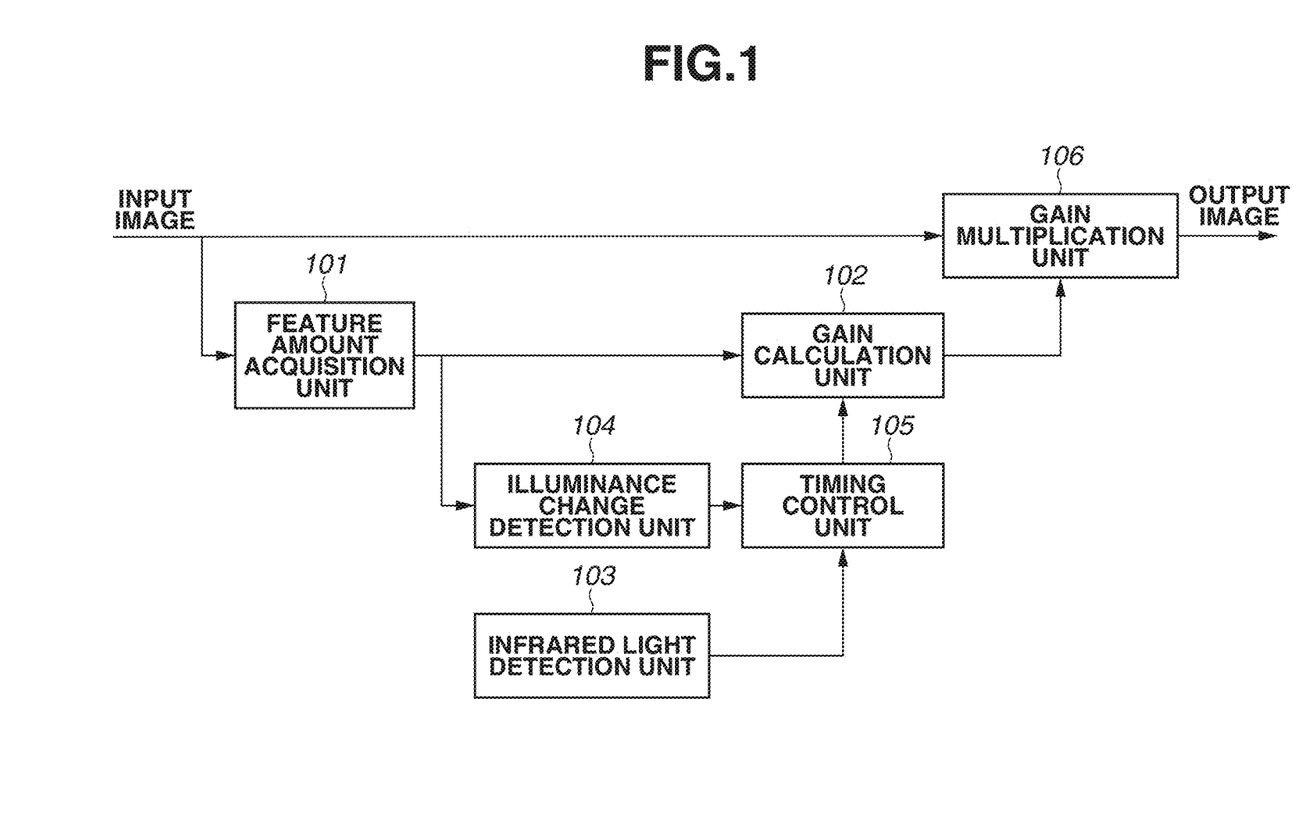
FIG. 1 is a configuration diagram illustrating an image processing apparatus according to a first exemplary embodiment.

FIG. 1 is a block diagram illustrating a configuration example of an image processing apparatus 100 according to a first exemplary embodiment.

In the following, the image processing apparatus 100 according to the first exemplary embodiment is described with reference to FIG. 1. The image processing apparatus according to the present exemplary embodiment is assumed to be an apparatus incorporated in or connected to an imaging apparatus such as a digital camera and a monitoring camera.

An input image is an image captured by an imaging unit (not illustrated) including a lens and an imaging sensor. The input image is image data (or image signal) including a plurality of pixels, and includes information on a plurality of colors. The plurality of colors is, for example, red (R), green (G), and blue (B). The image data is data corresponding to a quantity of light that has passed through color filters corresponding to the respective colors provided on the imaging sensor (not illustrated), and converted into electric signals by the imaging sensor. The color filters allow not only visible light corresponding to red, green, and blue but also part of infrared light (invisible light) to pass therethrough. Therefore, a common imaging apparatus includes an infrared cutoff filter (IRCF) to remove infrared light components, thereby obtaining an image close to a human visual sense. The imaging sensor includes an imaging device such as a complementary metal-oxide semiconductor (CMOS) sensor and a charge-coupled device (CCD) sensor.

An output image is an image in which white balance is properly corrected by multiplying pixel values of the input image by a white balance gain that is a final white balance control value determined in a manner described below. In the following description, the white balance is referred to as WB as appropriate. Although details are described below, the image processing apparatus according to the present exemplary embodiment obtains the output image having properly corrected white balance by performing white balance control (WB control) depending on whether the input image is influenced by the infrared light taken in by the imaging sensor.

A feature amount acquisition unit 101 acquires a feature amount relating to colors of the input image, and outputs the feature amount to a gain calculation unit 102. More specifically, in a case where the input image is divided into a plurality of rectangular areas, the feature amount acquisition unit 101 acquires color information for each rectangular area determined by the image data included in each rectangular area. The color information is, for example, a representative value of color difference signals for each rectangular area, and the representative value is, for example, an average value and a most frequent value.

The gain calculation unit 102 calculates the white balance control value based on the feature amount of the input image at an instructed timing. For example, the gain calculation unit 102 acquires the color information for each area from the feature amount acquisition unit 101, and calculates a representative value of the color information on the input image. Further, the gain calculation unit 102 calculates, as the white balance control value, a white balance gain (hereinafter, referred to as WB gain) to cause the representative value of the color information on the output image to be a predetermined target value, at a timing instructed by a timing control unit 105. In the present exemplary embodiment, the WB gain used for the white balance control includes, for example, a red gain for adjusting redness of the image and a blue gain for adjusting blueness of the image. The information on the WB gain calculated by the gain calculation unit 102 is transmitted to a gain multiplication unit 106. At timings other than the timing instructed by the timing control unit 105, a WB gain calculated at a timing instructed by the timing control unit 105 in the past is transmitted to the gain multiplication unit 106.

An infrared light detection unit 103 detects influence of the infrared light on the colors of the input image. More specifically, the infrared light detection unit 103 detects whether the colors of the input image are influenced by the infrared light taken in by the imaging sensor, and outputs a result of the detection to the timing control unit 105. For example, in a case where the IRCF (not illustrated) is inserted into the optical axis of the lens of the imaging unit, the infrared light detection unit 103 detects that the colors of the input image are not influenced by the infrared light. In contrast, in a case where the IRCF is not inserted into the optical axis of the lens of the imaging unit (is removed from the optical axis), the infrared light detection unit 103 detects that the colors of the input image are influenced by the infrared light.

An illuminance change detection unit 104 detects illuminance change in an environment where the input image is captured. More specifically, the illuminance change detection unit 104 acquires current illuminance information, and detects illuminance change in a case where a difference between the current illuminance information and illuminance information acquired at a timing when the infrared light detection unit 103 detects influence of the infrared light on the colors of the input image is a predetermined value or more. Further, the illuminance change detection unit 104 outputs a result of the detection to the timing control unit 105. The illuminance information may be calculated based on the brightness of the input image or an exposure condition. Alternatively, an illuminance sensor (not illustrated) may be provided, and the illuminance information may be calculated based on a read value of the illuminance sensor. Further, based on distribution of the color information for each area of the input image, a magnitude of deviation of the distribution of the color information may be used as the illuminance information. This is because the color components of the object are reduced as the illuminance is lower, and the distribution of the color information is accordingly deviated to a specific color area.

The timing control unit 105 informs the gain calculation unit 102 about a WB gain calculation timing. More specifically, the timing control unit 105 determines the WB gain calculation timing based on the detection result of the illuminance change and the detection result of influence of the infrared light, and outputs the timing to the gain calculation unit 102. The timing control unit 105 outputs, to the gain calculation unit 102, a timing when presence/absence of influence of the infrared light is switched and a timing when presence of influence of the infrared light is detected and presence of illuminance change is detected, as the WB gain calculation timing.

The gain multiplication unit 106 acquires the WB gain from the gain calculation unit 102, generates an output image with the white balance controlled by multiplying the input image by the WB gain, and outputs the output image.

Figure 2:
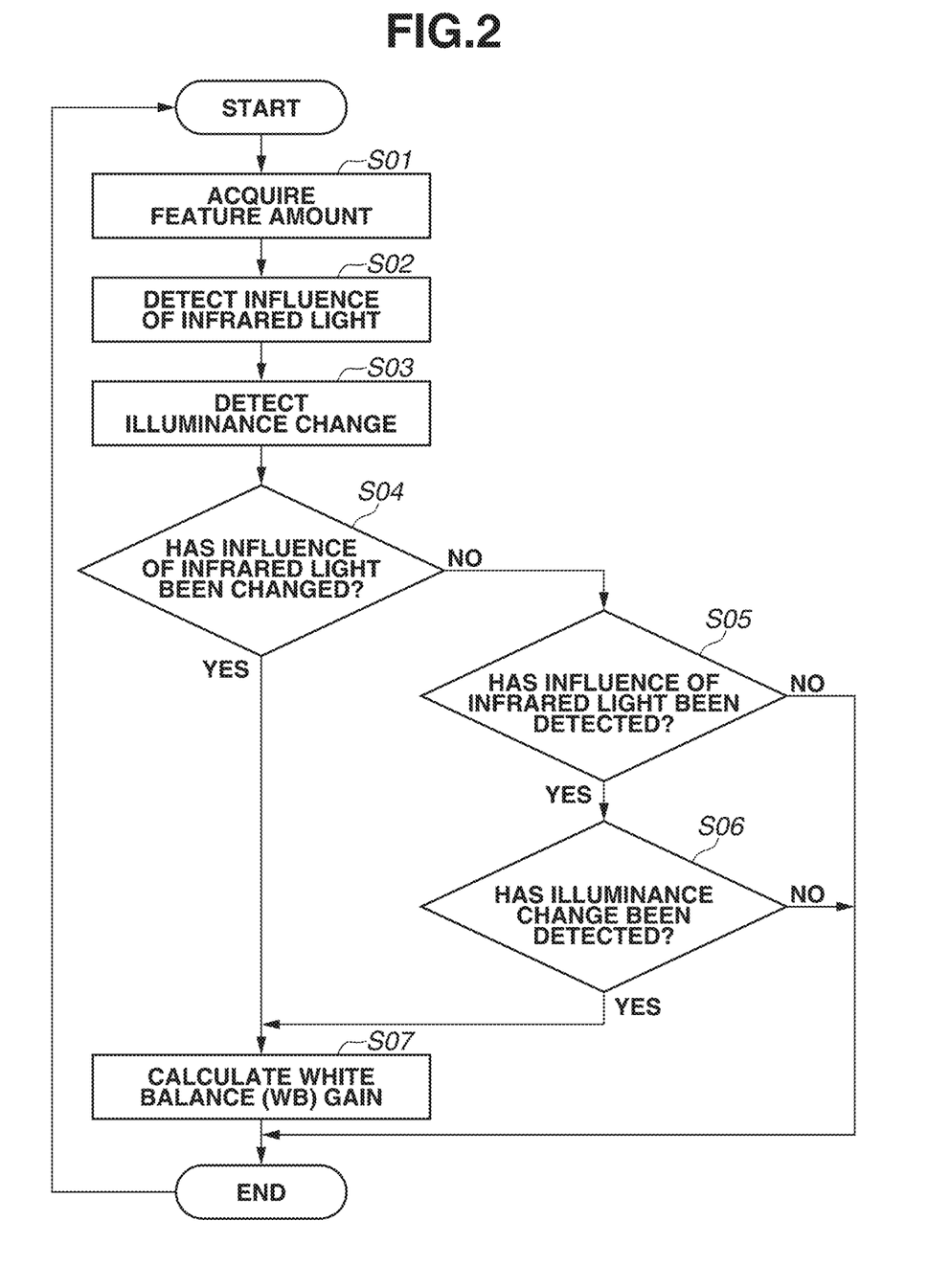
FIG. 2 is a flowchart illustrating a part of a processing flow according to an exemplary embodiment the present invention.

FIG. 2 is a flowchart illustrating an example of a main flow of image processing performed by the image processing apparatus according to the present exemplary embodiment. In the following, an example of the image processing according to the present exemplary embodiment is described with reference to the flowchart in FIG. 2.

In step S01, the feature amount acquisition unit 101 acquires the feature amount relating to the colors of the input image.

In step S02, the infrared light detection unit 103 detects whether the colors of the input image have been influenced by the infrared light taken in by the imaging sensor.

In step S03, the illuminance change detection unit 104 detects the illuminance change in the environment where the input image is captured.

In step S04, the timing control unit 105 determines whether influence of the infrared light on the colors of the input image has been changed. In a case where it is determined that influence of the infrared light has been changed (YES in step S04), the processing proceeds to step S07. In a case where it is determined that influence of the infrared light has not been changed (NO in step S04), the processing proceeds to step S05.

In step S05, in a case where the infrared light detection unit 103 has detected influence of the infrared light on the colors of the input image (YES in step S05), the processing proceeds to step S06. In contrast, in a case where the infrared light detection unit 103 has not detected influence of the infrared light on the colors of the input image (NO in step S05), the processing ends.

In step S06, in a case where the illuminance change detection unit 104 has detected illuminance change (YES in step S06), the processing proceeds to step S07. In contrast, in a case where the illuminance change detection unit 104 has not detected an illuminance change (NO in step S06), the processing ends.

In step S07, the gain calculation unit 102 calculates the white balance gain (WB gain) based on the feature amount acquired in step S01. The processing then ends.

In the following, the white balance gain control according to the present exemplary embodiment and effects thereof are described.

Figure 3:
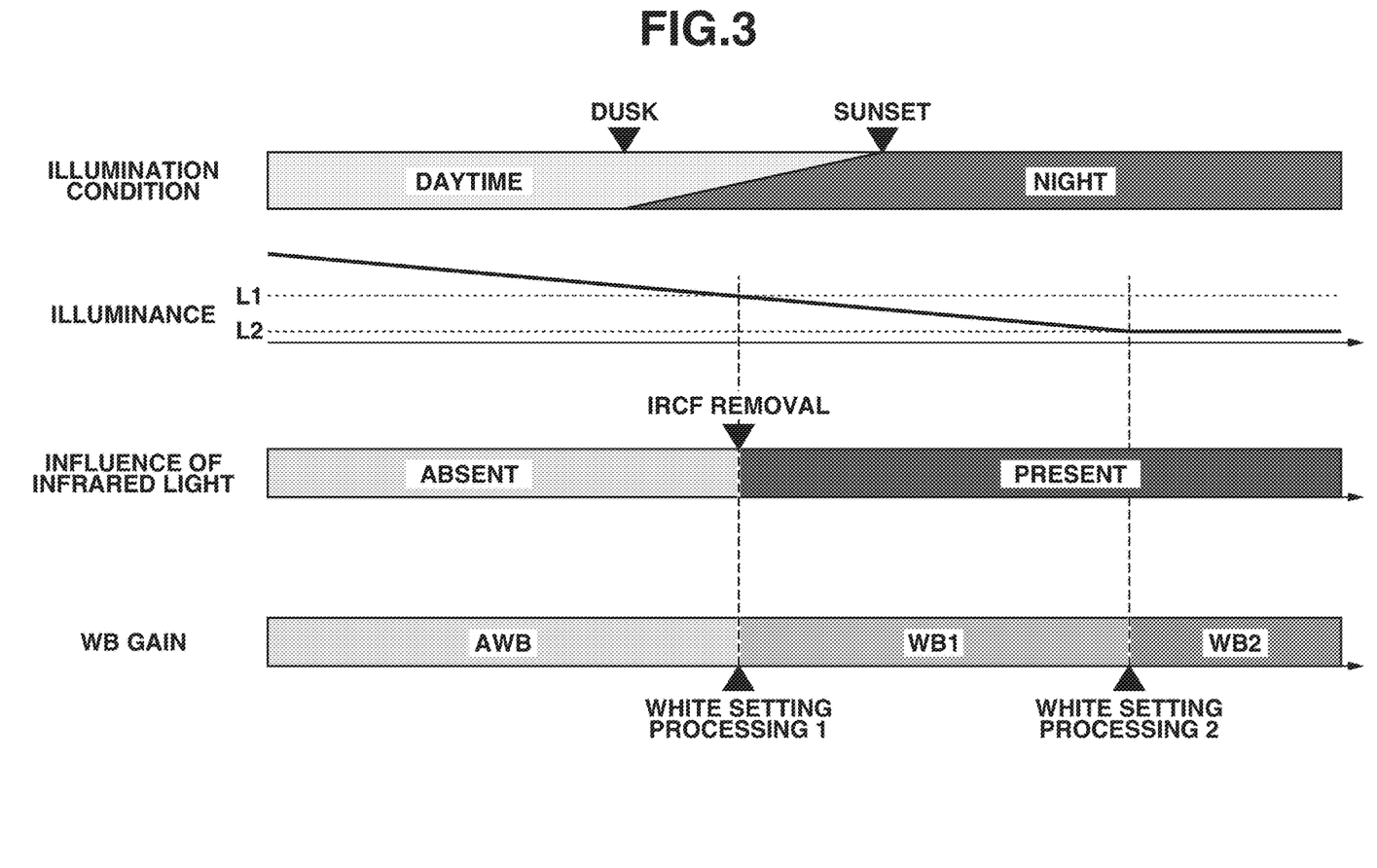
FIG. 3 is a diagram illustrating an example of white balance gain control according to the first exemplary embodiment.

FIG. 3 is a diagram illustrating an example of the white balance (WB) gain control according to the present exemplary embodiment.

FIG. 3 illustrates illuminance change and a change of influence of the infrared light on the colors of the captured image in an illumination environment before and after sunset when transition from daytime to nighttime occurs, and also illustrates an example of the WB gain control according to the present exemplary embodiment corresponding thereto.

As illustrated in FIG. 3, the illuminance keeps decreasing during dusk and for a while after sunset. After adequate time elapses from sunset, the illuminance is sufficiently lowered and becomes stable. During the period, at a time point when the illuminance becomes less than a predetermined value L1, the IRCF is removed in order to compensate for deficiency in the sensitivity of the imaging sensor. In the WB gain control according to the present exemplary embodiment, at a timing when the illuminance becomes less than the predetermined value L1 and the IRCF is removed, first white setting processing (white setting processing 1) is performed. The white setting processing is processing for calculating the WB gain based on the captured image at the execution timing of the white setting processing, and fixing the WB gain at the calculated WB gain. Therefore, as illustrated in FIG. 3, although the WB gain is successively changed based on the captured image by auto white balance (AWB) processing before the IRCF is removed, the WB gain is fixed at a WB gain WB1 after the IRCF is removed. A WB gain WB1 is a WB gain calculated at the timing when the IRCF is removed, i.e., at the timing when the illuminance becomes less than the predetermined value L1. Further, in the WB gain control according to the present exemplary embodiment, at a timing when the illuminance becomes less than a predetermined value L2, second white setting processing (white setting processing 2) is performed. In other words, after the illuminance becomes less than the predetermined value L2, the WB gain is fixed at a WB gain WB2 that is calculated at the timing when the illuminance becomes less than the predetermined value L2.

When the IRCF is removed and influence of the infrared light on the captured image is changed, the color tones of the captured image are largely changed. Therefore, proper white balance is also largely changed. The image processing apparatus according to the present exemplary embodiment performs the white setting processing at the timing when the IRCF is removed, to apply the WB gain for properly controlling the white balance in a manner coping with the large change of the hue of the captured image. Further, since the WB gain is fixed, the image processing apparatus according to the present exemplary embodiment can perform the stable white balance control without depending on the colors of the object even in a case where an object with its colors deviated is captured. When the illuminance of the imaging environment is changed after the IRCF is removed, the visible light and the infrared light are unbalanced, and thus the optimum white balance is changed. At this time, if the WB gain is fixed, the white balance cannot follow a change in the environment and is impaired. The image processing apparatus according to the present exemplary embodiment performs the white setting processing again at a timing when illuminance change in the imaging environment is detected after the IRCF is removed. As a result, the proper white balance can be maintained in a manner capable of coping with the illuminance change in the imaging environment after the IRCF is removed, and the stable white balance control can be performed without depending on the colors of the object.

The illuminance change detection unit 104 successively calculates (measures) temporal illuminance change after the timing when the infrared light detection unit 103 detects influence of the infrared light on the colors of the input image. The illuminance change detection unit 104 may detect that the illuminance is stabilized to a constant value (substantially constant value), and output a result of the detection to the timing control unit 105. In the case where the illuminance is stabilized to the constant value, the proper white balance is also stabilized. Therefore, the white setting processing is performed at the timing when the illuminance is stabilized to the constant value and the WB gain is fixed, which makes it possible to perform the proper white balance control.

Second Exemplary Embodiment

In the following, the image processing apparatus 100 according to a second exemplary embodiment is described. In the above-described exemplary embodiment, the timing when the white setting processing is performed is controlled based on presence/absence of influence of the infrared light and presence/absence of the illuminance change.

In the second exemplary embodiment, the timing when the white setting processing is performed is controlled based on presence/absence of influence of the infrared light and an elapsed time from the timing when the previous white setting processing is performed. Thus, in the second exemplary embodiment, the proper white balance control can be performed based on a speed of change in the illumination environment.

Figure 4:
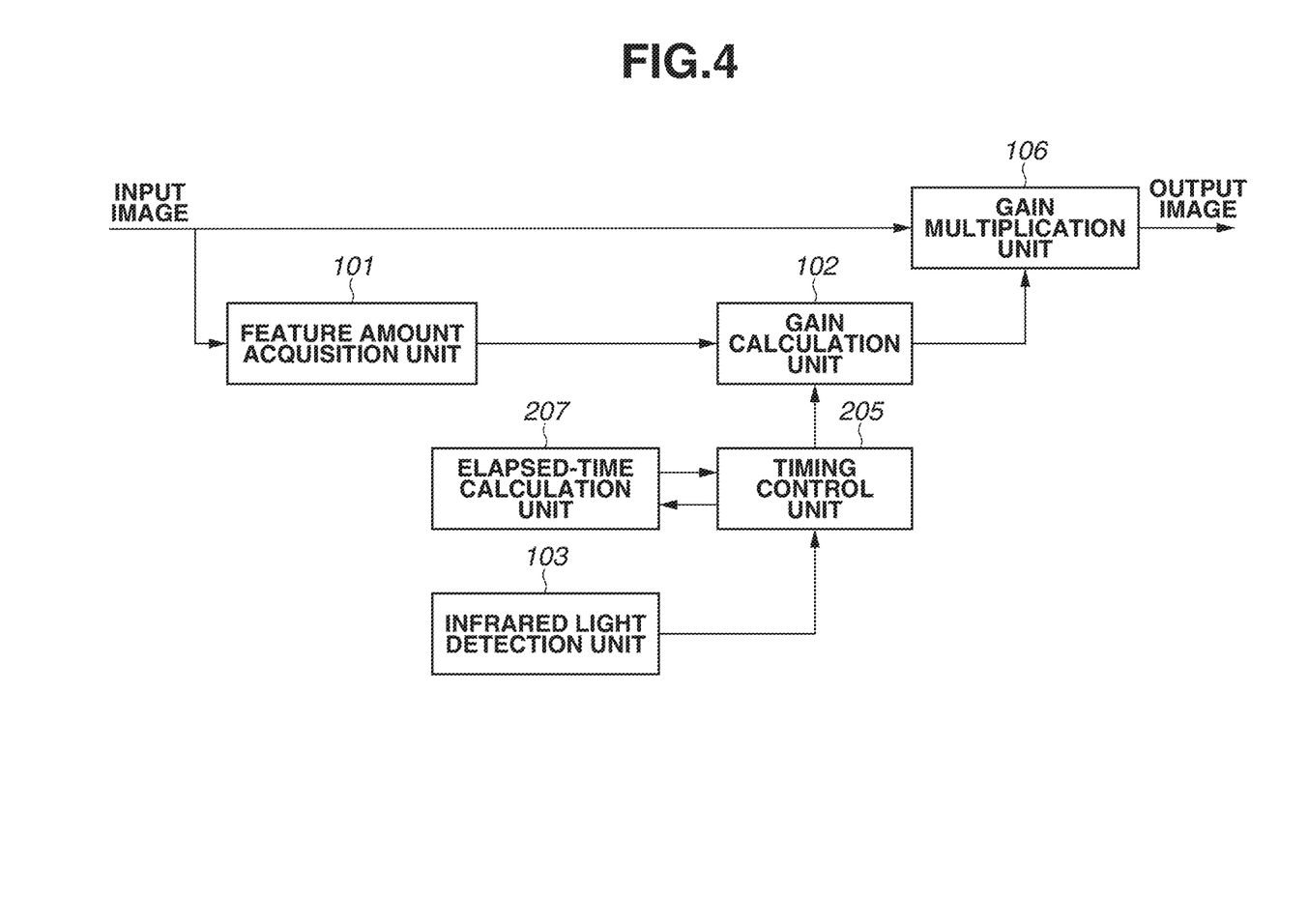
FIG. 4 is a configuration diagram illustrating an image processing apparatus according to a second exemplary embodiment.

FIG. 4 is a configuration diagram illustrating an example of a functional configuration of the image processing apparatus according to the second exemplary embodiment. The functional units same as the functional units in the first exemplary embodiment are denoted by the same reference numerals, and description thereof is omitted.

A timing control unit 205 informs the gain calculation unit 102 of a WB gain calculation timing. More specifically, the timing control unit 205 determines the WB gain calculation timing based on the detection result of influence of the infrared light, and the elapsed time from the last WB gain calculation timing, and outputs the timing to the gain calculation unit 102. The timing control unit 205 outputs, to the gain calculation unit 102, the timing when presence/absence of influence of the infrared light is switched, and the timing when a predetermined time elapses from the last WB gain calculation timing, as the WB gain calculation timing.

An elapsed-time calculation unit 207 calculates an elapsed time from the last WB gain calculation timing. More specifically, the elapsed-time calculation unit 207 acquires the WB gain calculation timing from the timing control unit 205 and calculates the elapsed time from that timing, and in a case where the elapsed time becomes a predetermined time or more, the elapsed-time calculation unit 207 notifies the timing control unit 205 of the lapse of the predetermined time.

Figure 5:
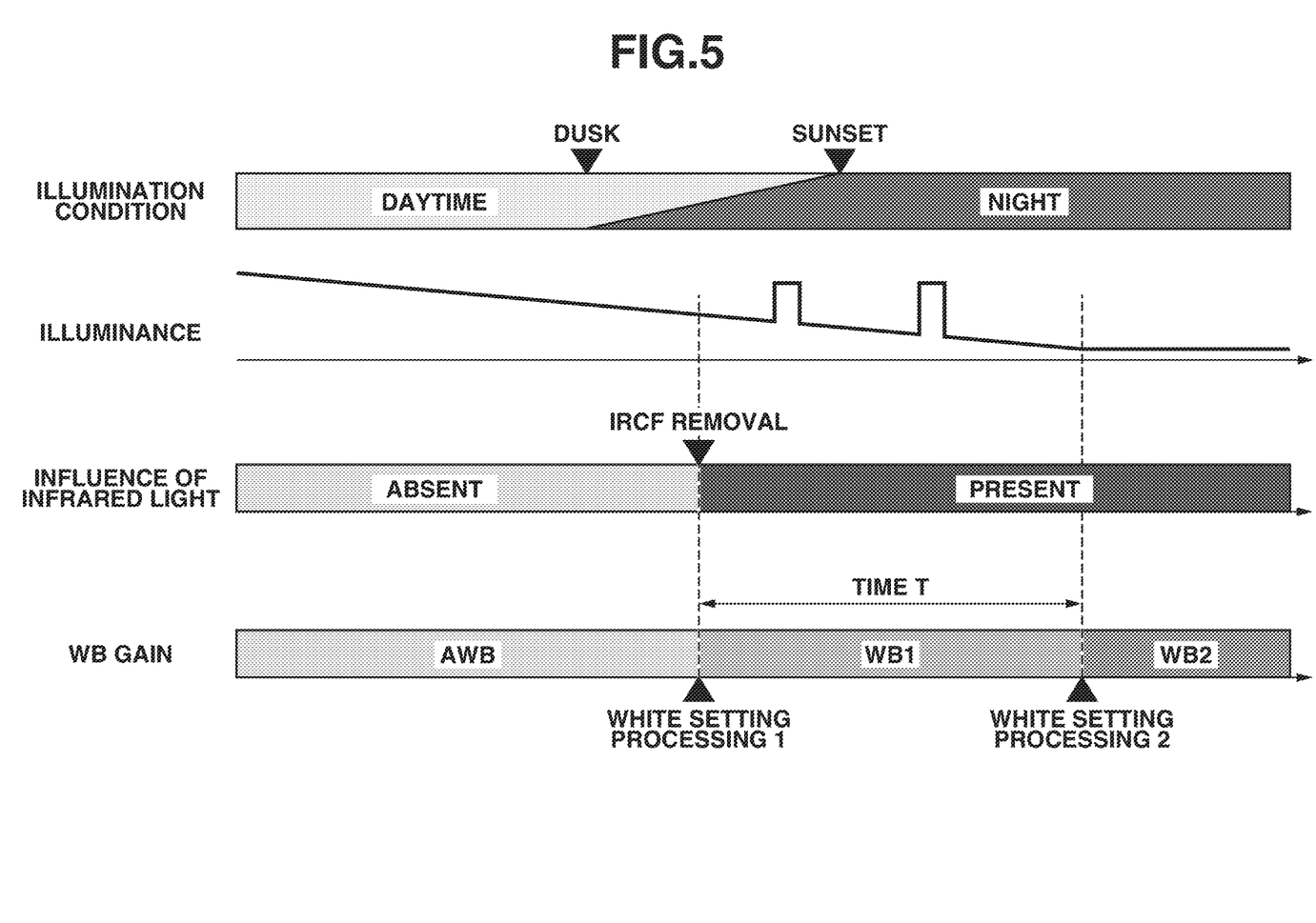
FIG. 5 is a diagram illustrating an example of white balance gain control according to the second exemplary embodiment.

White balance control according to the present exemplary embodiment is described with reference to FIG. 5. As illustrated in FIG. 5, in the WB gain control according to the present exemplary embodiment, the first white setting processing (white setting processing 1) is performed at the timing when the IRCF is removed. The white setting processing is processing for calculating the WB gain based on the captured image at the execution timing of the white setting processing, and fixing the WB gain at the calculated WB gain. Thus, as illustrated in FIG. 5, the WB gain is fixed at the WB gain WB1 after the IRCF is removed. Further, in the WB gain control according to the present exemplary embodiment, at a timing when a time T is elapsed from execution of the first white setting processing, the second white setting processing (white setting processing 2) is performed. In other words, the WB gain is fixed at the WB gain WB2 that is calculated at the timing when the time T is elapsed from execution of the first white setting processing.

Effects of the present exemplary embodiment are described. As illustrated in FIG. 5, when short-term illuminance change occurs after the IRCF is removed, and if the white balance is controlled based on the short-term illuminance change, the white balance becomes unstable due to a change of the WB gain in a short term, which may cause unnaturalness in terms of image quality.

Therefore, in the present exemplary embodiment, the first white setting processing is performed at the timing when the IRCF is removed, and the second white setting processing is performed at the timing when the time T is elapsed from execution of the first white setting processing. This makes it possible to prevent the white balance from being controlled based on the short-term illuminance change, and stable white balance control can be performed.

The elapsed-time calculation unit 207 may acquire the illuminance information in the imaging environment, calculate a period of time during which the illuminance continuously changes after the last WB gain calculation timing, and notify the timing control unit 205 of a timing when the period of time during which the illuminance continuously changes is a predetermined period or longer. Alternatively, the elapsed-time calculation unit 207 may detect discontinuous illuminance change, stop integration of the elapsed time during a period of time during which the discontinuous illuminance change is detected, and resume the integration of the elapsed time after the discontinuous illuminance change is not detected. This makes it possible to control the white balance more stably.

Figure 6:
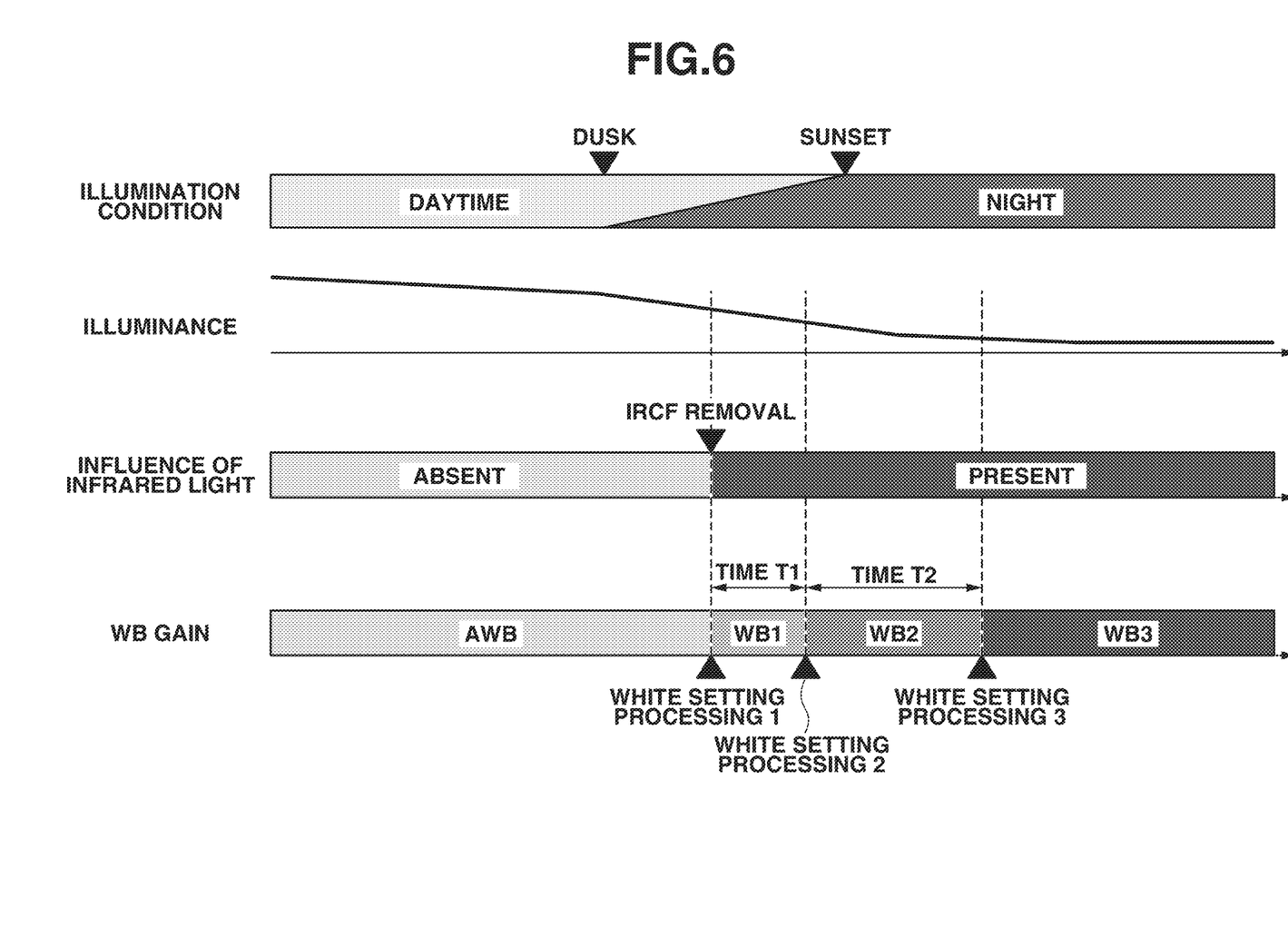
FIG. 6 is a diagram illustrating an example of white balance gain control according to the second exemplary embodiment.

The timing control unit 205 may output the WB gain calculation timing to the gain calculation unit 102 a plurality of times, after the WB gain is calculated at removal of the IRCF. In a case where the WB gain is calculated a plurality of times in the IRCF removal state, the elapsed time from the last WB gain calculation timing notified by the elapsed-time calculation unit 207 may be changed every time the WB gain is calculated.

The white balance control in the case where the timing control is performed in the above-described manner is described with reference to FIG. 6. As illustrated in FIG. 6, in the WB gain control according to the present exemplary embodiment, the first white setting processing (white setting processing 1) is performed at the timing when the IRCF is removed. The white setting processing is processing for calculating the WB gain based on the captured image at the execution timing of the white setting processing, and fixing the WB gain at the calculated WB gain. Thus, as illustrated in FIG. 6, the WB gain is fixed at the WB gain WB1 after the IRCF is removed. Further, in the WB gain control according to the present exemplary embodiment, at a timing when a time T1 is elapsed from execution of the first white setting processing, the second white setting processing (white setting processing 2) is performed. In other words, the WB gain is fixed at the WB gain WB2 that is calculated at the timing when the time T1 is elapsed from execution of the first white setting processing. Furthermore, in the WB gain control according to the present exemplary embodiment, at a timing when a time T2 is elapsed from execution of the second white setting processing, third white setting processing (white setting processing 3) is performed. In other words, the WB gain is fixed at a WB gain WB3 that is calculated at the timing when the time T2 is elapsed from execution of the second white setting processing. At this time, the time T2 is set to a time longer than the time T1. In other words, the control is performed such that the period of time in which the white setting processing is performed is set to a longer period of time as the number of times of the white setting processing is increased after the removal of the IRCF.

As described above, immediately after the IRCF is removed, i.e., in a time zone before and after the sunset when the illuminance changes fast, the white setting processing is performed in a relatively short period of time, which makes it possible to perform the white balance control in a manner capable of coping with the fast illuminance change. In contrast, in a time zone after a certain time is elapsed from sunset when the illuminance changes slowly, the white setting processing is performed in a relatively long period of time, which makes it possible to perform stable white balance control.

Third Exemplary Embodiment

Next, the image processing apparatus 100 according to a third exemplary embodiment is described. White balance control according to the third exemplary embodiment is performed so as to narrow a possible range of the WB gain every time the WB gain calculation (white setting processing) is repeated. In other words, the white balance control is performed such that the WB gain is difficult to be changed as the WB gain calculation (white setting processing) is repeated.

The functional configuration of the image processing apparatus according to the present exemplary embodiment is the same as the functional configurations of the image processing apparatuses according to the first and second exemplary embodiments. Therefore, the description thereof is omitted. In addition, description of the functional units same as those in the first and second exemplary embodiments is omitted, and only a functional unit having a function different from the functions of the functional units in the first and second exemplary embodiments is described below.

Figure 7:
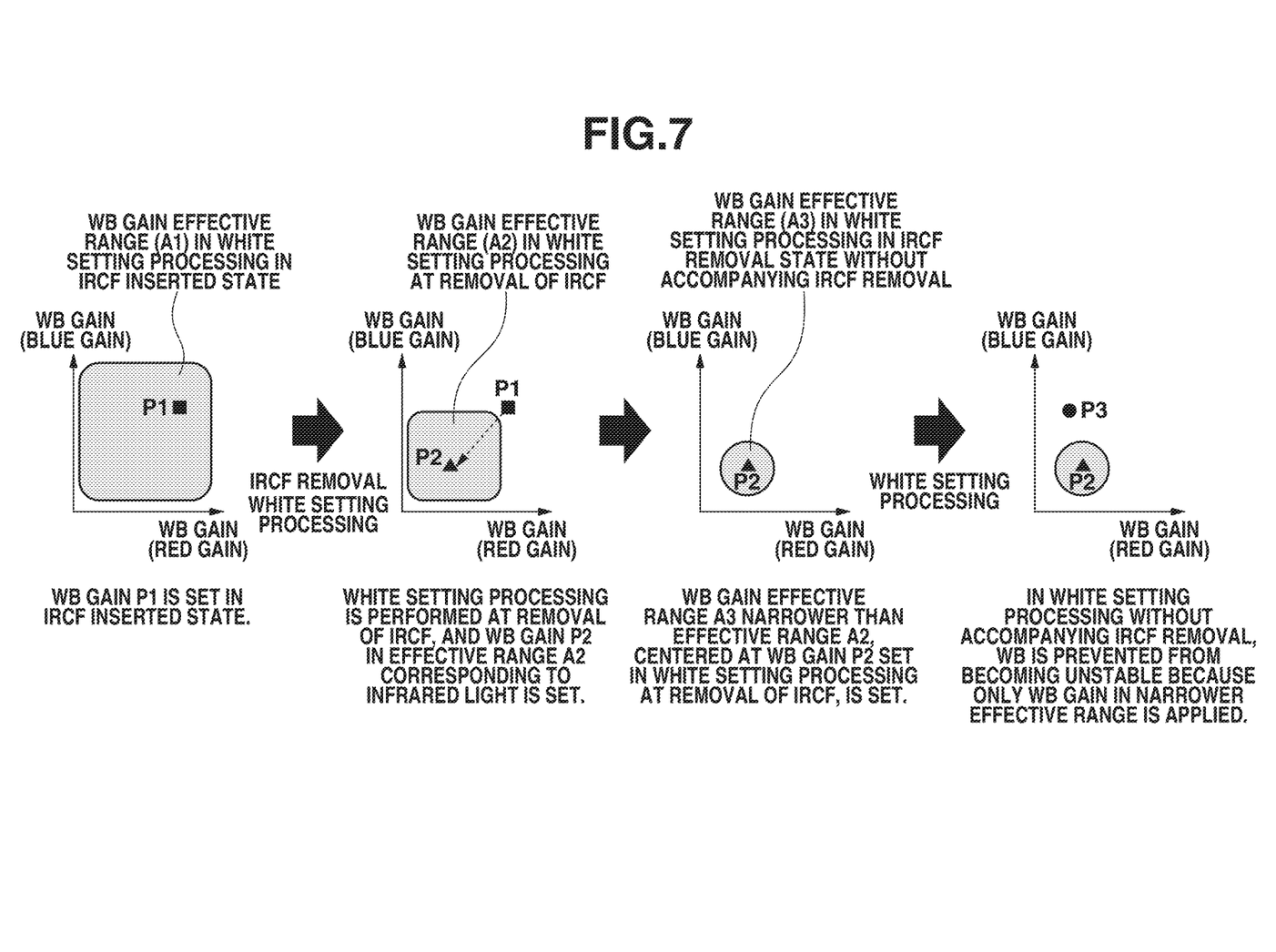
FIG. 7 is a diagram illustrating an example of white balance gain control according to a third exemplary embodiment.

A gain calculation unit (not illustrated) according to the present exemplary embodiment performs control so as to narrow the possible range of the WB gain (effective range of WB gain) every time the gain calculation (white setting processing) is repeated at the timing instructed from the timing control unit 105 or 205 after the removal of the IRCF. In a case where the calculated WB gain is within the effective range, the gain calculation unit transmits the calculated WB gain to the gain multiplication unit 106. In contrast, in a case where the calculated WB gain is out of the effective range, the gain calculation unit does not transmit the calculated WB gain to the gain multiplication unit 106, but outputs the WB gain calculated in the past to the gain multiplication unit 106, thereby maintaining the WB gain.

The white balance control according to the present exemplary embodiment is described with reference to FIG. 7. As illustrated in FIG. 7, in an IRCF inserted state, a WB gain (e.g., P1) included in a WB gain effective range A1 is used. In the first white setting processing at the removal of the IRCF, a WB gain (e.g., P2) included in a WB gain effective range A2 narrower than the WB gain effective range A1 is used. As a result, it is easy to apply white balance in a manner suitable for a quantity of infrared light taken in after the IRCF is removed. In the second white setting processing performed after the first white setting processing, a WB gain included in a WB gain effective range A3 that includes the WB gain P2 and is narrower than the WB gain effective range A2 is used. In other words, in a case where a WB gain (e.g., P3) out of the WB gain effective range A3 is calculated in the second white setting processing, the WB gain P3 is not used, and the WB gain P2 is maintained.

As described above, immediately after the IRCF is removed, i.e., in a time zone when the illuminance change is large before and after sunset, the white setting processing is performed with the relatively wide WB gain effective range, which makes it possible to perform the white balance control in a manner capable of coping with the large illuminance change. In contrast, in a time zone after a certain time is elapsed from sunset when the illuminance change is small, the white setting processing is performed with the relatively narrow WB gain effective range, which makes it possible to suppress variation of the WB gain and to perform stable white balance control.

Figure 8:
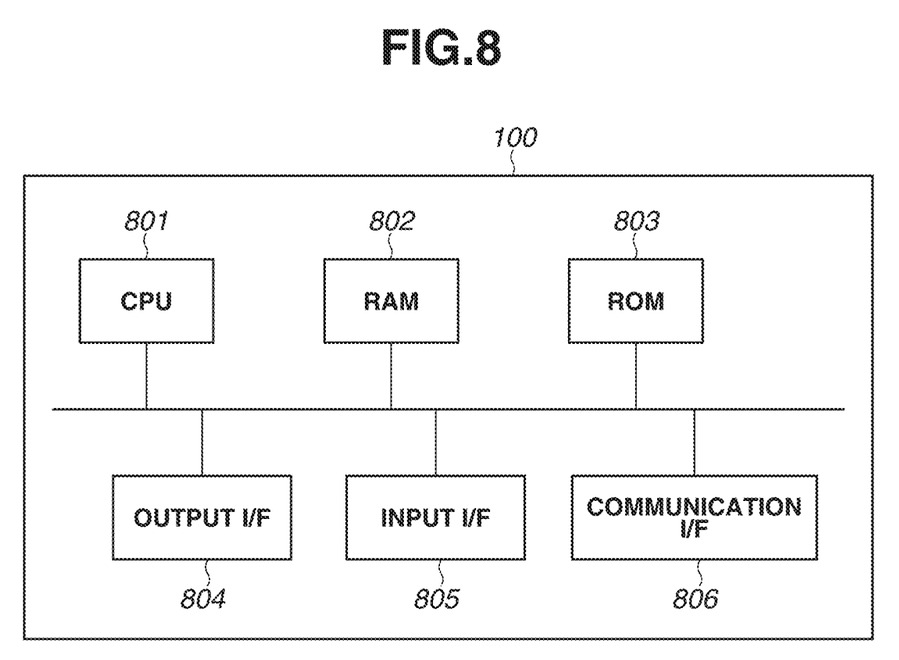
FIG. 8 is a hardware configuration diagram illustrating the image processing apparatus according to any of the first to third exemplary embodiments.

In the above-described exemplary embodiments, the example in which the image processing apparatus is applied to the imaging apparatus is described; however, the image processing apparatus may be implemented by an information processing apparatus (computer) such as a personal computer and a smartphone connected to the imaging apparatus. In this case, the imaging apparatus outputs, to the computer, raw data captured by the imaging unit, imaging parameters indicating an exposure time, a frame rate, an exposure value and the like, and information indicating use/unuse of the IRCF, i.e., information indicating presence/absence of influence of the infrared light on the colors of the input image. The information indicating presence/absence of influence of the infrared light may be input by a user. The computer then performs image processing similar to the image processing described in the above-described exemplary embodiments. The computer in this example executes program codes of software for implementing the image processing according to the exemplary embodiments. FIG. 8 is a hardware configuration diagram common to the first to third exemplary embodiments. The computer for implementing the image processing apparatus 100 according to each of the exemplary embodiments includes a central processing unit (CPU) 801, a random access memory (RAM) 802, a read only memory (ROM) 803, an auxiliary storage device (not illustrated), an output interface (I/F) 804 for outputting an output image to a display unit (not illustrated) such as a display, an input I/F 805 for receiving an input image and an input operation from an operation unit (not illustrated), such as a mouse and a keyboard, a communication I/F 806, and a bus. The CPU 801 controls the whole of the computer by using computer programs and data stored in the RAM 802 and the ROM 803, and performs the white balance control and the processing described above. In addition, the image processing apparatus according to each of the exemplary embodiments may include one or a plurality of pieces of dedicated hardware different from the CPU 801, and at least a part of processing performed by the CPU 801 may be performed by the dedicated hardware. Examples of the dedicated hardware include an application specific integrated circuit (ASIC), a field programmable gate array (FPGA), and a digital signal processor (DSP). The ROM stores programs and the like that does not require any change. The RAM temporarily stores programs and data supplied from the auxiliary storage device, data supplied from outside via the communication I/F 806, and the like. The auxiliary storage device includes a hard disk drive (HDD), and stores various data such as the image data, the imaging parameters, and the information indicating presence/absence of influence of the infrared light. The display unit includes, for example, a liquid crystal display or a light-emitting diode (LED) display, and displays the output image output via the output I/F 804, a graphical user interface (GUI) for the user to operate the image processing apparatus, and the like. The operation unit includes, for example, a keyboard, a mouse, a joystick, or a touch panel, receives operations performed by the user and inputs various kinds of instructions to the CPU 801 via the input I/F 805. The CPU 801 also operates as a display control unit controlling the display unit, and an operation control unit controlling the operation unit. The communication I/F 806 is used for communication with an apparatus outside the image processing apparatus. For example, in a case where the image processing apparatus is further connected to an external apparatus in a wired manner, a communication cable is connected to the communication I/F 806. In a case where the image processing apparatus has a function of wirelessly communicating with the external apparatus, the communication I/F 806 includes an antenna. The bus connects the units of the image processing apparatus and allows the units to transmit information to one another. In the exemplary embodiments described above, the external apparatus connected to the image processing apparatus is the above-described imaging apparatus, other information processing apparatus, and the like. The display unit and the operation unit are provided inside the image processing apparatus in the above described exemplary embodiments; however, at least one of the display unit and the operation unit may be provided as a separate device outside the image processing apparatus. The image processing apparatus may not necessarily include the display unit and the operation unit.

Although some exemplary embodiments of the present invention are described above, the present invention is not limited to the exemplary embodiments, and various modifications and changes can be made to the exemplary embodiments within the scope of the gist of the present invention.

The present invention can be realized by supplying a program for realizing one or more functions of the above-described exemplary embodiments to a system or an apparatus through a network or a storage medium, and causing one or more processors of a computer in the system or the apparatus to read out and execute the program. Further, the present invention can be realized by a circuit (e.g., ASIC) realizing one or more functions.

The above-described exemplary embodiments are mere embodied examples for implementing the present invention, and the technical scope of the present invention should not be interpreted in a limited manner by the above-described exemplary embodiments. In other words, the present invention can be implemented in various forms without departing from the technical idea or the main features of the present invention.

The present invention is not limited to the above-described exemplary embodiments, and various modifications and changes can be made to the exemplary embodiments without departing from the spirit and the scope of the present invention. To apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to provide an imaging apparatus that can properly control white balance in an IRCF removal state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   at least one processor; and
   a memory coupled to the at least one processor, the memory storing instructions that, when executed by the at least one processor, cause the at least one processor to:
   perform a detection on influence of infrared light on colors of an input image;
   calculate a white balance control value based on the input image; and
   control a timing when the white balance control value for the input image is calculated,
   wherein the white balance control value is calculated at a first timing when a result of the detection is changed, and a second timing when presence of the influence of the infrared light is detected,
   wherein an elapsed time is measured from the first timing and the second timing is set based on the elapsed time, and
   wherein, in a case where control is performed to calculate the white balance control value at a plurality of second timings, the second timings are determined such that an elapsed time from the timing when the white balance control value is calculated increases every time the white balance control value is calculated.

2. The image processing apparatus according to claim 1, wherein the instructions cause the at least one processor to:
   acquire illuminance information in an environment where the input image is captured; and
   set the second timing based on the illuminance information.

3. The image processing apparatus according to claim 2, wherein the instructions cause the at least one processor to set, as the second timing, a timing when a difference between the illuminance information at the first timing and the illuminance information at a current timing becomes a predetermined value or more.

4. The image processing apparatus according to claim 1, wherein the instructions cause the at least one processor to:
   measure temporal change in the illuminance information; and set, as the second timing, a timing when the illuminance information is detected to be substantially constant temporally.

5. The image processing apparatus according to claim 1, wherein the instructions cause the at least one processor to set, as the second timing, a timing when a predetermined time or more elapses from the first timing.

6. The image processing apparatus according to claim 1, wherein the instructions cause the at least one processor to:
in a case where the white balance control value calculated based on the input image is within a predetermined range, output the white balance control value calculated based on the input image;
in a case where the white balance control value calculated based on the input image is out of the predetermined range, output a white balance control value output in a past; and
narrow the predetermined range every time the white balance control value is calculated.

7. An image processing method comprising:
performing a detection on influence of infrared light on colors of an input image;
calculating a white balance control value based on the input image; and
controlling a timing when the white balance control value for the input image is calculated,
wherein the white balance control value is calculated at a first timing when a result of the detection is changed, and a second timing when presence of the influence of the infrared light is detected,
wherein an elapsed time is measured from the first timing and the second timing is set based on the elapsed time, and
wherein, in a case where control is performed to calculate the white balance control value at a plurality of second timings, the second timings are determined such that an elapsed time from the timing when the white balance control value is calculated increases every time the white balance control value is calculated.

8. A non-transitory computer-readable storage medium storing a program for causing a computer to execute a method comprising:
performing a detection on influence of infrared light on colors of an input image;
calculating a white balance control value based on the input image; and
controlling a timing when the white balance control value for the input image is calculated,
wherein the white balance control value is calculated at a first timing when a result of the detection is changed, and a second timing when presence of the influence of the infrared light is detected,
wherein an elapsed time is measured from the first timing and the second timing is set based on the elapsed time, and
wherein, in a case where control is performed to calculate the white balance control value at a plurality of second timings, the second timings are determined such that an elapsed time from the timing when the white balance control value is calculated increases every time the white balance control value is calculated.

* * * * *